Figure 1:
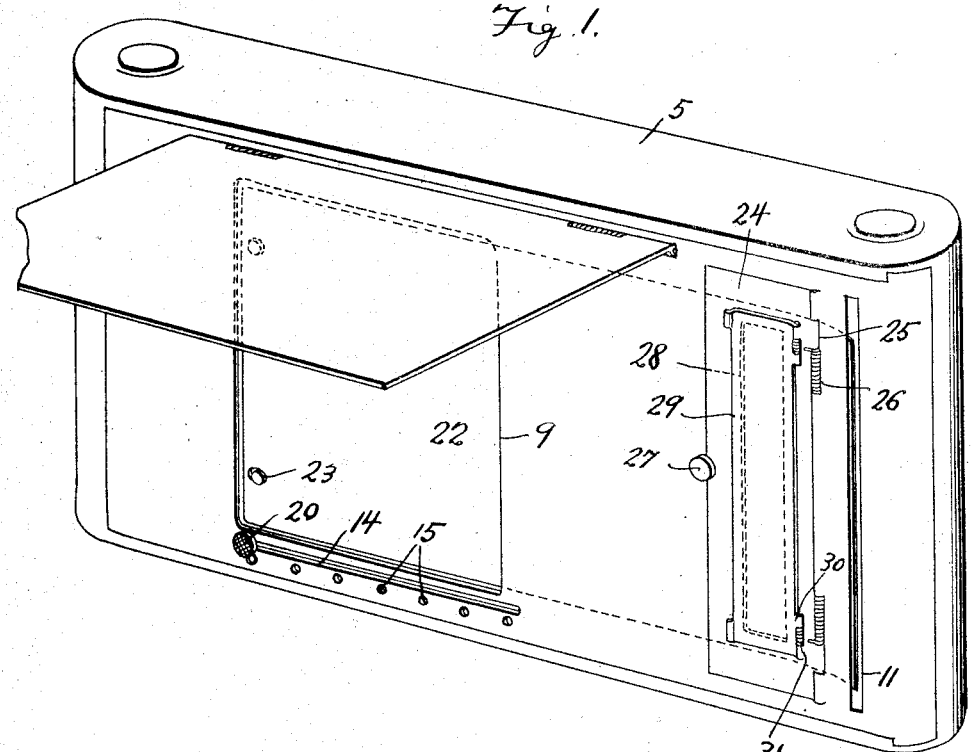

April 5, 1927. 1,623,534
F. X. A. DUHAMEL
CAMERA
Filed June 21, 1926   2 Sheets-Sheet 1

Inventor
François Xavier Adrien Duhamel
By Clarence A. O'Brien
Attorney

April 5, 1927.　　F. X. A. DUHAMEL　　1,623,534
CAMERA
Filed June 21, 1926　　2 Sheets-Sheet 2

Inventor
François Xavier Adrien Duhamel
By Clarence A. O'Brien
Attorney

Patented Apr. 5, 1927.

1,623,534

UNITED STATES PATENT OFFICE.

FRANCOIS XAVIER ADRIEN DUHAMEL, OF OTTAWA, ONTARIO, CANADA.

CAMERA.

Application filed June 21, 1926. Serial No. 117,427.

The present invention relates to a device for use with cameras whereby suitable indicia may be marked on the film so as to be printed on the pictures when printed therefrom.

My improvement resides in the provision of a device of this nature which is more accessible than the structure now in common use and possesses the features of advantage such as convenience, ease of manipulation, cheapness of manufacture, efficiency and reliability.

Another important object of the invention lies in the provision of a device of this nature wherein the indicia may be written by any ordinary pencil or pen or may be printed, typewritten, or in any other suitable form.

With the above and numerous other objects in view as will appear as the description proceeds, the invention resides in certain novel features of construction, and in the combination and arrangement of parts as will be hereinafter more fully described and claimed.

In the drawing:—

Figure 2:
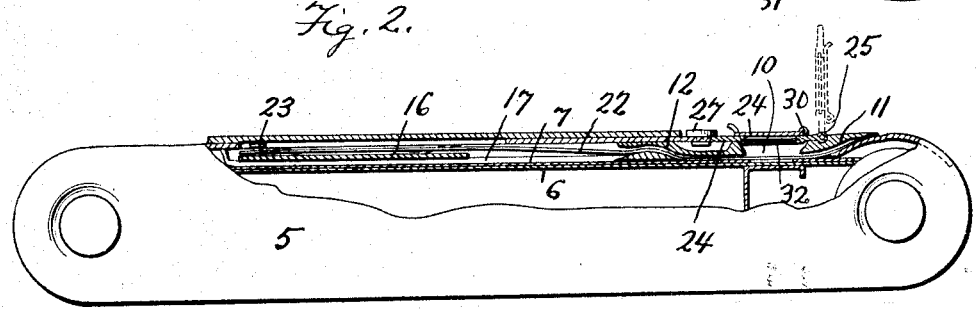
Figure 3:
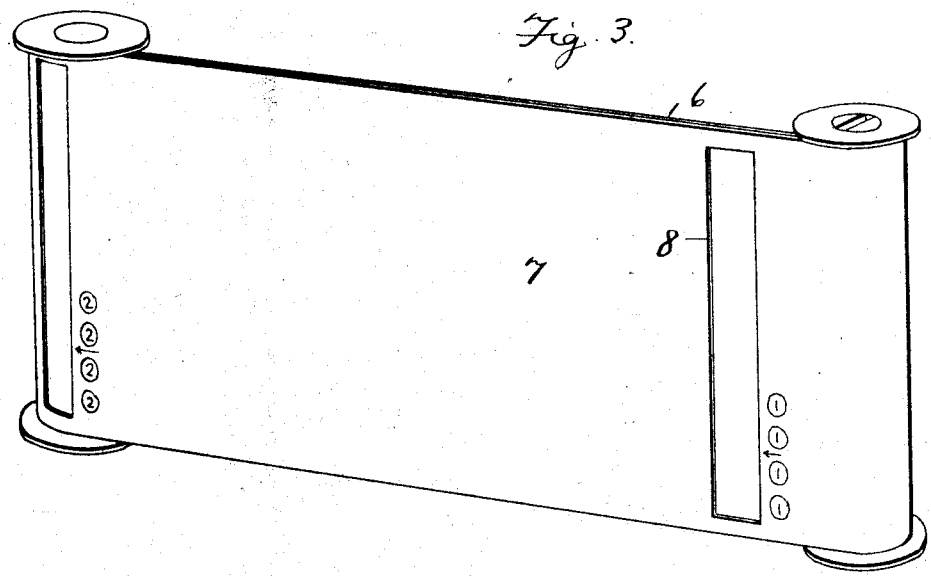
Figure 4:
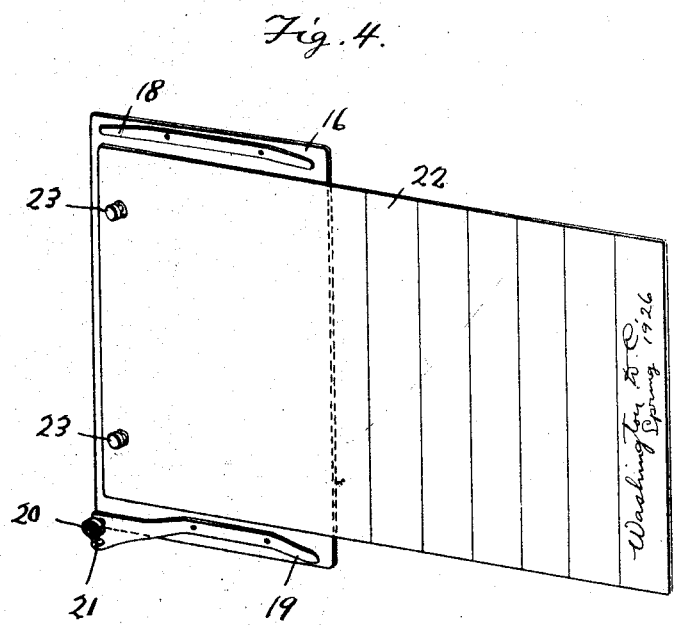

Figure 1 is a perspective view of a camera showing my device incorporated therein, Fig. 2 is an edge elevation, partly in section of a camera embodying the features of this device, Fig. 3 is a perspective view of the film and film protector strips, showing the slots in the latter, and Fig. 4 is a perspective view of the slide plate used in this device.

Referring to the drawing in detail, it will be seen that the numeral 5 designates an ordinary camera having the usual means therein for supporting a roll of film for exposure. The film is indicated by the numeral 6 and has the usual protector strip of paper associated therewith. In the present instance, I provide this protector strip 7 with a plurality of transversely extending slots 8, one for each exposure.

The film and the protector strip are covered and claimed in my divisional application, Serial No. 161,360, filed January 15, 1927.

The mirror of the camera is provided with an opening 9 and an opening 10. The opening 10 has sinuous tunnels 11 and 12 leading thereto. The back of the camera is provided with an elongated slot 14 and a series of openings 15 arranged alongside of it. A plate 16 is insertible through the opening 9 and guides 17 are provided in the camera over which this plate is slidable. Springs 18 and 19 are provided on the sides of the plate for bearing against the inside of the rear of the camera. The spring 19 is provided with a knob 20, the shank of which pierces the slot 14 and with a pin 21 which is adapted to pierce the openings 15 so that the plate may be held in different adjusted positions, this being accomplished by pressing inwardly on the knob 20, then sliding the plate so that the pin 21 may project in the desired opening 15.

A sheet of paper 22 is attached to the plate 16 by any suitable means, such as at 23, and extends beyond one edge thereof as is clearly shown in Figs. 2 and 4.

In using this device, the person writes the desired indicia on the strip 22, and it is then attached to the plate 16, and trained through tunnels 12 and 11. A closure 24 is hinged as at 25 for closing the opening 10. Springs 26 are associated with the closure 24 to normally hold the same open. This closure is held in a closed position by a suitable latch 27. The closure 24 has an opening 28. A door 29 is hinged as at 30 on the closure 24 for normally closing the opening 28 by means of springs 31.

A red transparency 32 is disposed over the opening 28. Thus, the door 29 may be opened to ascertain when the slot 8 and the proper portion of the strip 22 is disposed in registry with the opening 10. When these parts are properly disposed, the closure 24 may be opened, thereby causing an exposure so that the indicia on the sheet 22 will be taken on the film and afterwards printed on the picture.

With this device, it will be seen that considerable more freedom of operation is allowable than with the ordinary means now in common use. The device is exceedingly convenient, and yet may be manufactured at a low cost, and insures accuracy and great freedom.

The present embodiment of the invention has been disclosed in detail merely by way of example, since in actual practice it attains the features of advantage enumerated as desirable in the statement of the invention and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:—

1. In a camera, a wall having an opening with a slot arranged alongside of it and a series of apertures arranged alongside of the slot, said wall being further provided with a second opening with sinuous tunnels leading thereto, a closure hinged to the wall to close over the second opening, a plate, means for slidably mounting the plate inside the wall so that a strip of paper thereon may be accessible to the first opening and trained through the tunnels to extend across the second opening, a spring on the plate, a pin on the strip adapted to pierce the apertures, and means piercing the slot to bend the spring to disengage the pin from the apertures.

2. In a camera, a wall having an opening, said wall being provided with a second opening having a pair of sinuous tunnels leading thereto, a closure hinged to the wall to close over the second opening, a plate, means for slidably mounting the plate inside the wall so that a strip of paper thereon may be accessible through the first opening and trained through the tunnels and across the second opening.

3. In a camera, a wall having an opening, said wall being provided with a second opening having a pair of sinuous tunnels leading thereto, a closure hinged to the wall to close over the second opening, a plate, means for slidably mounting the plate inside the wall so that a strip of paper thereon may be accessible through the first opening and trained through the tunnels and across the second opening, said closure being provided with an opening having a red transparency thereover, and a door hinged to the closure for closing over the transparency.

4. In a camera, a wall having an opening, said wall being provided with a second opening having a pair of sinuous tunnels leading thereto, a closure hinged to the wall to close over the second opening, a plate, means for slidably mounting the plate inside the wall so that a strip of paper thereon may be accessible through the first opening and trained through the tunnels and across the second opening, said closure being provided with an opening having a red transparency thereover, a door hinged to the closure for closing over the transparency, said wall being provided with a series of apertures alongside the first opening, a spring on said plate having a pin projectible through said apertures and means for bending the spring to disengage the pin from the apertures.

5. In a camera, a wall having an opening, said wall being provided with a second opening having a pair of sinuous tunnels leading thereto, a closure hinged to the wall to close over the second opening, a plate, means for slidably mounting the plate inside the wall so that a strip of paper thereon may be accessible through the first opening and trained through the tunnels and across the second opening, said closure being provided with an opening having a red transparency thereover, a door hinged to the closure for closing over the transparency, said wall being provided with a series of apertures alongside the first opening, a spring on said plate having a pin projectible through said apertures and means for bending the spring to disengage the pin from the apertures, means associated with said closure for normally holding the same open, a latch associated with said closure for holding the same closed, and springs associated with said door for normally holding the same closed.

In testimony whereof I affix my signature.

FRANCOIS XAVIER ADRIEN DUHAMEL.